(12) United States Patent
Wu et al.

(10) Patent No.: US 12,364,272 B2
(45) Date of Patent: Jul. 22, 2025

(54) FRUIT POST-HARVEST DISINFECTION AND CONVEYING PRODUCTION LINE

(71) Applicant: ZHEJIANG UNIVERSITY, Hangzhou (CN)

(72) Inventors: Di Wu, Hangzhou (CN); Dandan Zheng, Hangzhou (CN); Xiangzheng Yang, Hangzhou (CN); Chongde Sun, Hangzhou (CN); Kunsong Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/026,675

(22) Filed: Jan. 17, 2025

(65) Prior Publication Data

US 2025/0151741 A1  May 15, 2025

Related U.S. Application Data

(63) Continuation of application No. PCT/CN2024/073394, filed on Jan. 22, 2024.

(30) Foreign Application Priority Data

Apr. 11, 2023 (CN) .......................... 202310378191.4

(51) Int. Cl.
   *A23B 7/015* (2006.01)
   *A23B 7/158* (2006.01)
   *A23N 12/06* (2006.01)

(52) U.S. Cl.
   CPC .............. *A23B 7/158* (2013.01); *A23B 7/015* (2013.01); *A23V 2300/10* (2013.01)

(58) Field of Classification Search
   CPC ........ A23B 7/015; A23B 7/158; A23N 12/06; B65G 15/30; B65G 47/18
   (Continued)

(56) References Cited

U.S. PATENT DOCUMENTS 9,375,126 B2 * 6/2016 Abdulfattah .......... A47L 15/241
11,376,341 B2 * 7/2022 Gardiner ................... A61L 2/26

FOREIGN PATENT DOCUMENTS

CN      102179372 A      9/2011
CN      107497688 A     12/2017
(Continued)

OTHER PUBLICATIONS

US 2007/0059410 A1, Steffen, Mar. 15, 2007.*
(Continued)

*Primary Examiner* — Douglas A Hess
(74) *Attorney, Agent, or Firm* — Bayramoglu Law Offices LLC (57) ABSTRACT

A fruit post-harvest disinfection and conveying production line is provided. The production line solves the problem of waxberry type fruits, that is, due to the exposed flesh, it is necessary to minimize the time that water remains on the surface of the fruit during the spraying disinfection process. The fruit post-harvest disinfection and conveying production line includes a workbench, where the workbench is provided with multiple sets of conveyor belts; each set of conveyor belts includes a first conveyor belt and a second conveyor belt; an upper part of a front end of the conveyor belts is provided with an inclined feeding hopper; and the feeding hopper is provided with feeding ports corresponding to each set of conveyor belts.

14 Claims, 4 Drawing Sheets

(58) Field of Classification Search
USPC ................. 198/493; 426/236; 134/36, 61
See application file for complete search history.

(56) References Cited

FOREIGN PATENT DOCUMENTS

| | | | | |
|---|---|---|---|---|
| CN | 110754673 A | 2/2020 | | |
| CN | 210207537 U | 3/2020 | | |
| CN | 114271320 A | 4/2022 | | |
| CN | 114304259 A | 4/2022 | | |
| CN | 114950968 A | 8/2022 | | |
| CN | 116406701 A | 7/2023 | | |
| EP | 2572587 A1 * | 3/2013 | ............. | A23B 7/153 |
| WO | WO-2022107119 A1 * | 5/2022 | ............. | A23B 2/788 |

OTHER PUBLICATIONS

US 2020/0337353 A1, Abdallah, Oct. 29, 2020.*
US2022/0413166 A1, Saccomanno, Dec. 29, 2022.*
US 2023/0032992 A1, Chari et al., Feb. 2, 2023.*
US 2023/0284838 A1, Pallua et al., Sep. 14, 2023.*

* cited by examiner

FRUIT POST-HARVEST DISINFECTION AND CONVEYING PRODUCTION LINE

CROSS-REFERENCE TO THE RELATED APPLICATIONS

This application is a continuation application of International Application No. PCT/CN2024/073394, filed on Jan. 22, 2024, which is based upon and claims priority to Chinese Patent Application No. 202310378191.4, filed on Apr. 11, 2023, the entire contents of which are incorporated herein by reference.

TECHNICAL FIELD

The present disclosure belongs to the field of fruit post-harvest processing, and relates to a fruit picking and disinfection device, in particular to a fruit post-harvest disinfection and conveying production line.

BACKGROUND

With the development of industries and peoples' higher demands for quality of life, people have put forward higher requirements for the quality of fruits consumed in daily life. Direct consumption of fruits without skin, such as waxberry, requires a series of post-harvest processes including sorting, disinfection, and packaging to ensure fruit quality. Post-harvest disinfection can effectively extend the shelf life of waxberry type fruits growing in a complex wild environment, thereby fully utilizing the economic value of fruits. However, due to the flesh exposed outside, this type of fruits cannot be cleaned after harvesting, and needs to be kept dry during disinfection and packaging to minimize the retention time of water on the surface. At present, post-harvest disinfection of waxberry is usually carried out by manually spraying a disinfectant. This method has the problem of uneven spraying. In addition, water will accumulate on the surface of excessively stacked waxberries, affecting the quality of the waxberries.

Chinese patent application 2021116519210 discloses a method for post-harvest preservation of waxberry by a low-concentration disinfectant. The method combines a low-concentration peracetic acid disinfectant with atmospheric plasma treatment to achieve the goal of efficient harvest-post preservation of waxberry with a low-concentration disinfectant. The spraying of the disinfectant can be manually carried out through a laboratory method, but manual spraying cannot guarantee the evenness of spraying and cannot be applied in industry. Particularly, the prolonged residence time of the disinfectant during the industrialization process will affect the preservation of waxberry. However, currently, there is no good way to directly solve this problem.

SUMMARY

An objective of the present disclosure is to provide a fruit post-harvest disinfection and conveying production line. The present disclosure solves the problem of waxberry type fruits. Due to the exposed flesh of this type of fruit, it is necessary to minimize the time that water remains on the surface of the fruit during the spraying disinfection process. The present disclosure conveys sorted waxberry in a decentralized manner, sprays the disinfectant separately and evenly, quickly removes excess water on the surface of the flesh, and adjusts the width of the conveyor belt according to the shape of waxberry during the conveying process to reduce the drop-out of waxberry during conveying.

In order to solve the technical problem, the present disclosure adopts the following technical solution. A fruit post-harvest disinfection and conveying production line includes a workbench, where the workbench is provided with multiple sets of longitudinally parallel conveyor belts; each set of conveyor belts includes a first conveyor belt and a second conveyor belt; an upper part of a front end of the conveyor belts is provided with an inclined feeding hopper; the feeding hopper is provided with feeding ports corresponding to each set of conveyor belts; a first nozzle and a second nozzle for spraying a disinfectant are longitudinally arranged in sequence at a back side of the feeding hopper above a front part of each set of conveyor belts; a front side of the first nozzle is provided with an incoming material sensor; a discharge slope is provided below a back end of the conveyor belt; a back side of the discharge slope is provided with a tray rack; the tray rack is provided with a tray track; and a tray is fed from the tray track and aligned with a tail end of the discharge slope.

Take waxberry as an example, in the production line introduces sorted waxberry into the feeding hopper. The waxberry drops from each feeding port of the feeding hopper onto the conveyor belts for decentralized and separate conveyance. When the incoming material sensor detects that there is waxberry conveyed by the conveyor belt, the first nozzle sprays the disinfectant. According to the conveying speed of the conveyor belt, the second nozzle sprays the disinfectant at a fixed time interval. To ensure even spraying of the disinfectant, a third nozzle can also be provided at a back side of the second nozzle. During the backward conveying of the waxberry sprayed with the disinfectant, excess water drips from the gap between the conveyor belts. The surface water of the waxberry decreases when the waxberry is discharged from the back end of the conveyor belt to the tray. Each tray collects waxberry with a fixed weight through the weighing sensor and sends the waxberry into a plasma disinfection chamber. The plasma disinfection chamber provides plasma gas blowing for 3-5 minutes to achieve plasma disinfection and blow dry the residual water of the disinfectant.

Preferably, multiple first pulleys are longitudinally provided on each first conveyor belt; the first pulleys of adjacent first conveyor belts are aligned transversely, and all mutually aligned first pulleys are located on a same first rotating shaft; multiple second pulleys are longitudinally provided on each second conveyor belt; the second pulleys of adjacent second conveyor belts are aligned transversely, and all mutually aligned second pulleys are located on a same second rotating shaft; the first rotating shaft and the second rotating shaft are arranged parallel and staggered with each other; the first rotating shaft or the second rotating shaft is telescopic transversely; and alternatively, the first rotating shaft and the second rotating shaft both are telescopic transversely. The spacing between the first conveyor belt and the second conveyor belt is adjustable by the transversely telescopic first rotating shaft or second rotating shaft. Taking waxberry as an example, the sorted waxberry has a basically consistent outer diameter, so the spacing between the first conveyor belt and the second conveyor belt can be adjusted according to the outer diameter of the waxberry.

Preferably, the first rotating shaft and the second rotating shaft at a frontmost end of the conveyor belts are driving shafts.

Preferably, there is a discharge gap not less than 10 cm between the first rotating shaft and the second rotating shaft at a backmost end; specifically, a longitudinal spacing between a tail end of the first conveyor belt and a tail end of the second conveyor belt is not less than 10 cm; a fruit is discharged from the gap between the tail end of the first conveyor belt and the tail end of the second conveyor belt; and a surface of the workbench below the discharge gap is slanted to form the discharge slope that includes a higher front part and a lower back part. For traditional conveyor belts, fruits are discharged from the tail end of the conveyor belts. In the present disclosure, the first rotating shaft and the second rotating shaft of the first conveyor belt and the second conveyor belt are not coaxial, so the tail ends of the first conveyor belt and the second conveyor belt are not aligned. Therefore, the present disclosure increases the spacing between the tail ends of the first conveyor belt and the second conveyor belt, and provides a discharge slope below the gap between the tail ends of the first conveyor belt and the second conveyor belt. The discharge slope solves the problem of discharge caused by uneven tail ends of the first conveyor belt and the second conveyor belt.

Preferably, there is a difference in conveying speeds of the first conveyor belt and the second conveyor belt, and the difference does not exceed 5% of an average speed of the first conveyor belt and the second conveyor belt. Take waxberry as an example, the speed difference between the first conveyor belt and the second conveyor belt is adjustable according to the size of waxberry to ensure that the waxberry rotates more than one revolution between the first nozzle and the second nozzle, facilitating even spraying disinfection of the waxberry by the two nozzles.

Preferably, the workbench is provided with a channel below the conveyor belts; a bottom surface of the channel is provided with multiple longitudinally distributed air extracting ports; and the air extracting ports are connected to an air extracting pump. Air exhaust is performed below the workbench to reduce water during conveying. The residual water is extracted to reduce the outward diffusion of the disinfectant, creating a friendly disinfection working environment.

Preferably, the workbench is provided with a channel-shaped cover plate above the conveyor belts; the first nozzle, the second nozzle, and the incoming material sensor are located on the channel-shaped cover plate; and a top surface of a back part of the channel-shaped cover plate is provided with a bar grille hollow. The channel-shaped cover plate is used in conjunction with the air extraction below the workbench to reduce the evaporation and diffusion of the disinfectant. The bar grille hollow at the top surface of the back part of the channel-shaped cover plate can draw air below the workbench to form an airflow that blows over the surface of the fruit, thereby drying the water on the surface of the fruit.

Preferably, the tray track of the tray rack is configured to feed the tray from back to front; a frontmost end of the tray track forms a discharge station aligned with the tail end of the discharge slope; the tray track adopts a two-track design; a lifting cylinder for lifting from bottom to top is provided below the discharge station and located between two tracks of the tray track; a top of a piston of the lifting cylinder is provided with a lifting platform; the lifting platform is provided with a weighing sensor; a vertical stacking bin is provided above the discharge station; two sides of a bottom of the stacking bin are provided with latch bolts that are symmetrically arranged on the tray rack and move unidirectionally from bottom to top; and four corners of the tray are provided with spacing posts for ensuring a spacing between upper and lower trays. The weighing sensor monitors the weight of fruits on the tray to achieve tray replacement. After a set number of trays are stacked in the stacking bin, the trays are evenly transferred to the plasma disinfection chamber for subsequent processing. The plasma disinfection chamber provides plasma gas blowing for 3-5 minutes to achieve plasma disinfection and blow dry the residual water of the disinfectant.

Preferably, the latch bolt is an inverted L-shaped structure; a lower end of a vertical arm of the latch bolt is located on an elastic return rotating shaft; a horizontal arm of the latch bolt extends inward from an upper end of the vertical arm to support a bottom surface of the tray; and a limiting stopper is provided below the horizontal arm of the latch bolt.

Preferably, front and back sides of the lifting platform are respectively provided with swinging stoppers that extend upward and are higher than a top surface of the lifting platform; an upper end of the swinging stopper is able to swing unidirectionally towards an inner side of the lifting platform; and a height of the tray track exceeds the top surface of the lifting platform, but is lower than a top end of the swinging stopper. The swinging stopper at the back side of the lifting platform is pushed to swing during tray feeding, thereby cooperating with the sensor to identify the tray feeding state. The swinging stopper at the front side of the lifting platform is hit and limited by the tray and does not swing, thereby checking whether the tray is in place. The inner side surface of the top end of the swinging stopper is an inclined guide surface, which can correct the position of the tray during lifting.

The present disclosure has the following beneficial effects. The production line conveys the sorted waxberry type fruit in a decentralized manner for disinfection and air drying. The present disclosure ensures even spraying of the disinfectant and sufficient control of water during conveying, preparing for further disinfection treatment in the plasma gas chamber.

BRIEF DESCRIPTION OF THE DRAWINGS

The present disclosure is further described below with reference to the drawings.

Reference Numerals: 1. workbench; 2. conveyor belt; 3. first conveyor belt; 4. second conveyor belt; 5. first pulley; 6. second pulley; 7. first rotating shaft; 8. second rotating shaft; 9. feeding hopper; 10. feeding port; 11. channel-shaped cover plate; 12. bar grille hollow; 13. first nozzle; 14. second nozzle; 15. incoming material sensor; 16. channel; 17. air extracting port; 18. discharge slope; 19. tray rack; 20. tray; 21. spacing post; 22. tray track; 23. lifting cylinder; 24. lifting platform; 25. latch bolt; and 26. swinging stopper.

DETAILED DESCRIPTION OF THE EMBODIMENTS

The present disclosure will be further described below with reference to the specific embodiments and drawings.

Figure 1:
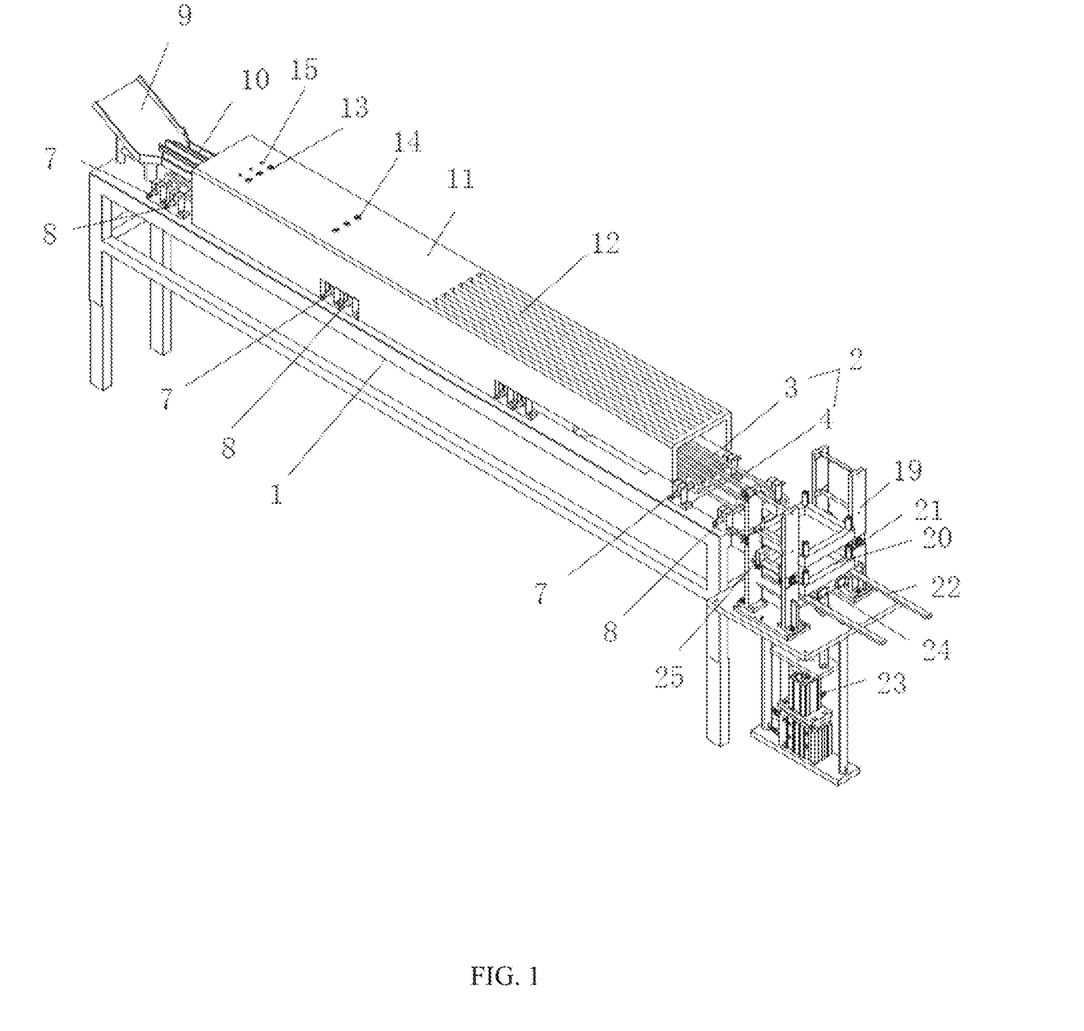
FIG. 1 is a structural diagram according to the present disclosure.
Figure 2:
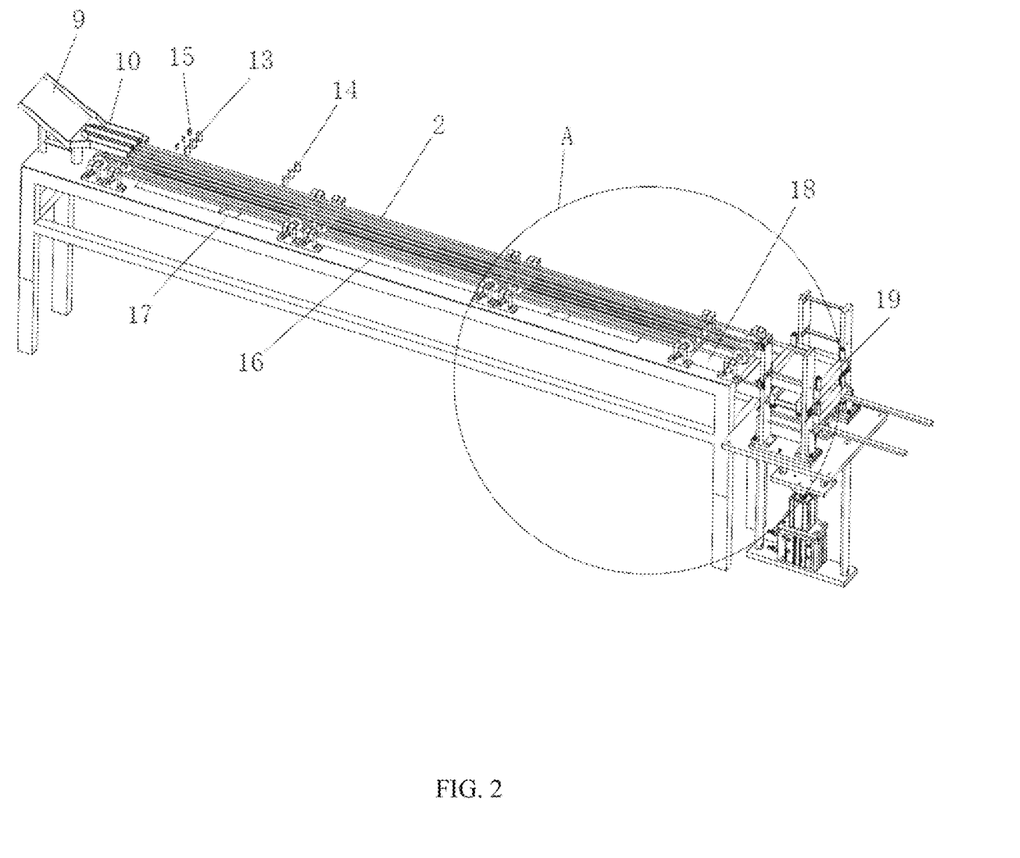
FIG. 2 is a structural diagram with a cover plate removed according to the present disclosure.
Figure 3:
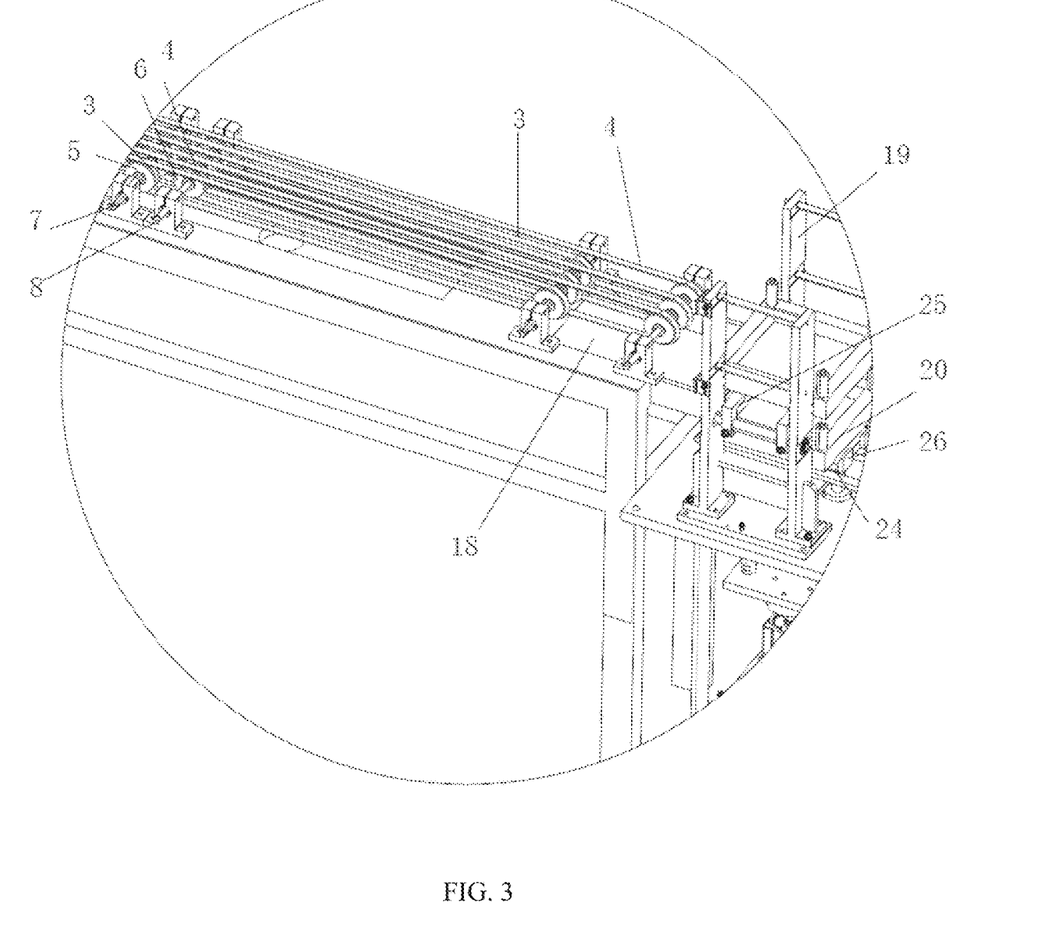
FIG. 3 is an enlarged view of A shown in FIG. 2 according to the present disclosure.

Embodiment: The present disclosure provides a post-harvest disinfection and conveying production line for waxberry, as shown in FIG. 1. The production line includes workbench 1. The workbench 1 is provided with multiple sets of longitudinally parallel conveyor belts 2. each set of conveyor belts includes first conveyor belt 3 and second conveyor belt 4. As shown in FIGS. 2 and 3, multiple first pulleys 5 are longitudinally provided on each first conveyor belt 3. The first pulleys of adjacent first conveyor belts are aligned transversely, and the mutually aligned first pulleys 5 of different sets of conveyor belts are located on same first rotating shaft 7. Multiple second pulleys 6 are longitudinally provided on each second conveyor belt 4. The second pulleys of adjacent second conveyor belts are aligned transversely, and the mutually aligned second pulleys of different sets of conveyor belts are located on same second rotating shaft 8. The first rotating shaft 7 and the second rotating shaft 8 are arranged parallel and staggered with each other. The first rotating shaft 7 and the second rotating shaft 8 are telescopic transversely. The first rotating shaft 7 and the second rotating shaft 8 at a frontmost end of the conveyor belts 2 are driving shafts. There is a difference in conveying speeds of the first conveyor belt 3 and the second conveyor belt 4, and the difference does not exceed 5% of an average speed of the first conveyor belt and the second conveyor belt. The workbench 1 is provided with channel 16 below the conveyor belts 2. A bottom surface of the channel is provided with two longitudinally distributed air extracting ports 17. The air extracting ports are connected to an air extracting pump. The workbench 1 is provided with channel-shaped cover plate 11 above the conveyor belts 2. The channel-shaped cover plate 11 is provided with first nozzle 13, second nozzle 14, and incoming material sensor 15. A top surface of a back part of the channel-shaped cover plate is provided with bar grille hollow 12.

An upper part of a front end of the conveyor belts 2 is provided with inclined feeding hopper 9. The feeding hopper is provided with feeding ports 10 corresponding to each set of conveyor belts. The first rotating shaft 7 and the second rotating shaft 8 at the frontmost end of the conveyor belts 2 are located below the feeding hopper to reduce belt shaking. As shown in FIG. 2, the first nozzle 13 and the second nozzle 14 for spraying a disinfectant are longitudinally arranged in sequence at a back side of the feeding hopper 9 above a front part of each set of conveyor belts 2. A front side of the first nozzle 13 is provided with the incoming material sensor 15. As shown in FIG. 3, there is a 20 cm discharge gap between the first rotating shaft 7 and the second rotating shaft 8 at a backmost end. That is, a longitudinal spacing between a tail end of the first conveyor belt and a tail end of the second conveyor belt is not less than 20 cm. The fruit is discharged from the gap between the tail end of the first conveyor belt and the tail end of the second conveyor belt. A surface of the workbench below the discharge gap is slanted to form discharge slope 18 that includes a higher front part and a lower back part. Tray rack 19 is provided at a back side of the discharge slope 18. The tray rack 19 is provided with tray track 22. Tray 20 is fed from the tray track and aligned with a tail end of the discharge slope 18.

Figure 4:
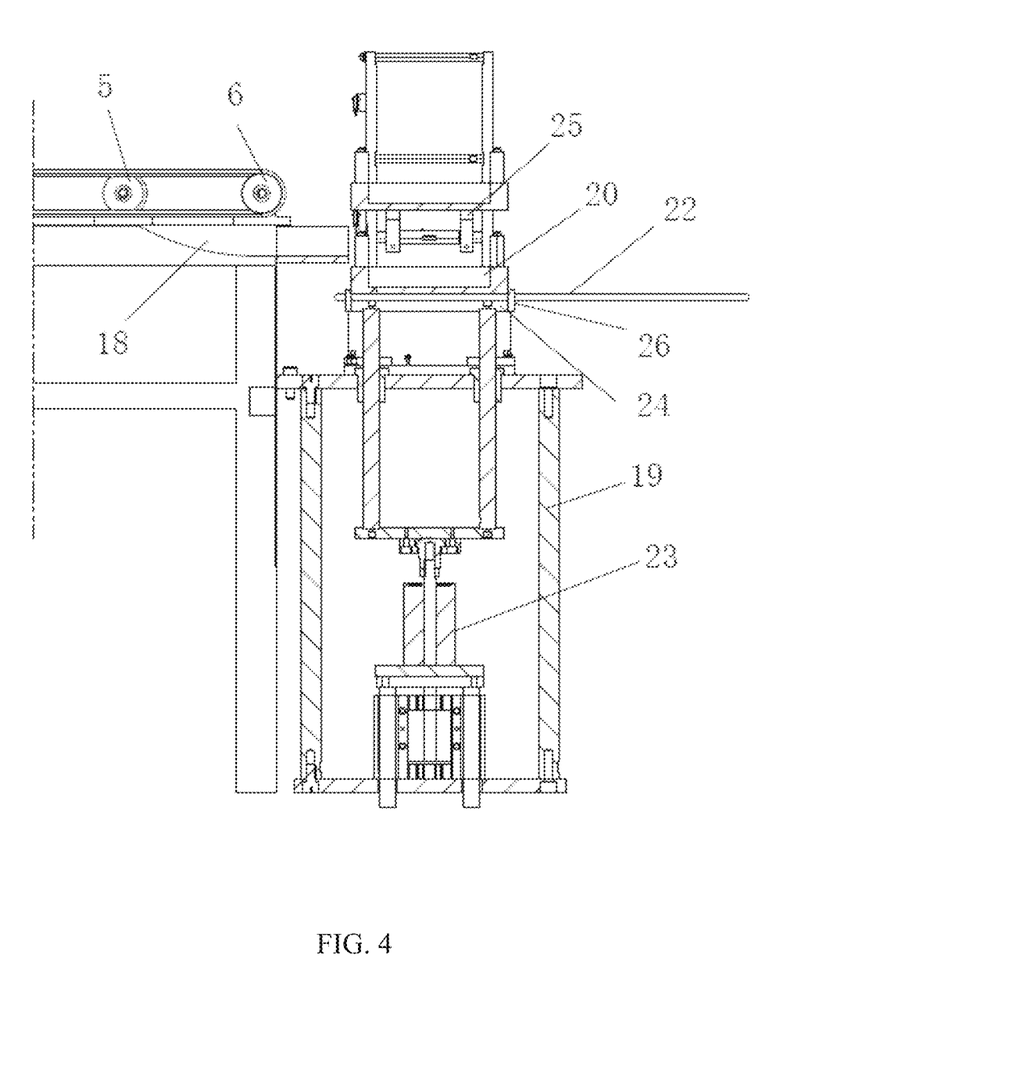
FIG. 4 is a structural diagram of a conveyor belt output end and a tray rack according to the present disclosure.

As shown in FIG. 4, the tray track 22 of the tray rack 19 feeds the tray 20 from back to front. A frontmost end of the tray track 22 forms a discharge station aligned with the tail end of the discharge slope 18. The tray track adopts a two-track design. Lifting cylinder 23 for lifting from bottom to top is provided below the discharge station and located between two tracks of the tray track. A top of a piston of the lifting cylinder is provided with lifting platform 24. The lifting platform is provided with a weighing sensor. Front and back sides of the lifting platform 24 are respectively provided with swinging stoppers 26 that extend upward and are higher than a top surface of the lifting platform. An upper end of the swinging stopper is able to swing unidirectionally towards an inner side of the lifting platform. A height of the tray track 22 exceeds the top surface of the lifting platform 24, but is lower than a top end of the swinging stopper 26. A vertical stacking bin is provided above the discharge station. Two sides of a bottom of the stacking bin are provided with latch bolts 25 that are symmetrically arranged on the tray rack and move unidirectionally from bottom to top. The latch bolt 25 is an inverted L-shaped structure. A lower end of a vertical arm of the latch bolt is located on an elastic return rotating shaft. A horizontal arm of the latch bolt extends inward from an upper end of the vertical arm to support a bottom surface of the tray. A limiting stopper is provided below the horizontal arm of the latch bolt. Four corners of the tray are provided with spacing posts 21 for ensuring a spacing between upper and lower trays.

The production line introduces sorted waxberry into the feeding hopper. The waxberry drops from each feeding port of the feeding hopper onto the conveyor belts for decentralized and separate conveyance. The width of the conveyor belt is adjustable according to the shape and size of the waxberry. When the incoming material sensor detects that there is waxberry conveyed by the conveyor belt, the first nozzle sprays the disinfectant. According to the conveying speed of the conveyor belt, the second nozzle sprays the disinfectant at a fixed time interval. There is a speed difference between the first conveyor belt and the second conveyor belt to ensure that the waxberry rotates more than one revolution between the first nozzle and the second nozzle, facilitating even spraying disinfection of the waxberry by the two nozzles. During the backward conveying of the waxberry sprayed with the disinfectant, excess water drips from the gap between the conveyor belts. In addition, the air extracting ports draw air and the airflow drawn in from a grille at the back part of the cover plate can dry the surface of the waxberry. Therefore, the surface water of the waxberry decreases when the waxberry is discharged from the backmost end of the conveyor belt to the tray. Each tray collects waxberry with a fixed weight through the weighing sensor and sends the waxberry into a plasma disinfection chamber. The plasma disinfection chamber provides plasma gas blowing for 3-5 minutes to achieve plasma disinfection and blow dry the residual water of the disinfectant.

The invention claimed is:
1. A fruit post-harvest disinfection and conveying production line, comprising a workbench, wherein the workbench is provided with a plurality of sets of longitudinally parallel conveyor belts; each set of conveyor belts comprises a first conveyor belt and a second conveyor belt; an upper part of a front end of the conveyor belts is provided with an inclined feeding hopper; the inclined feeding hopper is provided with feeding ports corresponding to each set of conveyor belts; a first nozzle and a second nozzle for spraying a disinfectant are longitudinally arranged in sequence at a back side of the inclined feeding hopper above a front part of each set of conveyor belts; a front side of the first nozzle is provided with an incoming material sensor; a discharge slope is provided below a back end of the conveyor belt; a back side of the discharge slope is provided with a tray rack; the tray rack is provided with a tray track; and a tray is fed from the tray track and aligned with a tail end of the discharge slope; wherein a plurality of first pulleys are longitudinally provided on each first conveyor belt; the first pulleys of adjacent first conveyor belts are aligned transversely, and all mutually aligned first pulleys are located on a same first rotating shaft; a plurality of second pulleys are longitudinally provided on each second conveyor belt; the second pulleys of adjacent second conveyor belts are aligned transversely, and all mutually aligned second pulleys are located on a same second rotating shaft; the first rotating shaft and the second rotating shaft are arranged parallel and staggered with each other; the first rotating shaft or the second rotating shaft is telescopic transversely; and alternatively, the first rotating shaft and the second rotating shaft both are telescopic transversely; there is a difference in conveying speeds of the first conveyor belt and the second conveyor belt, and the difference is less than or equal to 5% of an average speed of the first conveyor belt and the second conveyor belt.

2. The fruit post-harvest disinfection and conveying production line according to claim 1, wherein the first rotating shaft and the second rotating shaft at a frontmost end of the conveyor belts are driving shafts.

3. The fruit post-harvest disinfection and conveying production line according to claim 2, wherein there is a discharge gap greater than or equal to 10 cm between the first rotating shaft and the second rotating shaft at a backmost end; wherein a longitudinal spacing between a tail end of the first conveyor belt and a tail end of the second conveyor belt is greater than or equal to 10 cm; a fruit is discharged from a gap between the tail end of the first conveyor belt and the tail end of the second conveyor belt; and a surface of the workbench below the discharge gap is slanted to form the discharge slope, wherein the discharge slope comprises a higher front part and a lower back part.

4. The fruit post-harvest disinfection and conveying production line according to claim 2, wherein the workbench is provided with a channel below the conveyor belts; a bottom surface of the channel is provided with a plurality of longitudinally distributed air extracting ports; and the plurality of longitudinally distributed air extracting ports are connected to an air extracting pump.

5. The fruit post-harvest disinfection and conveying production line according to claim 2, wherein the workbench is provided with a channel-shaped cover plate above the conveyor belts; the first nozzle, the second nozzle, and the incoming material sensor are located on the channel-shaped cover plate; and a top surface of a back part of the channel-shaped cover plate is provided with a bar grille hollow.

6. The fruit post-harvest disinfection and conveying production line according to claim 2, wherein the tray track of the tray rack is configured to feed the tray from back to front; a frontmost end of the tray track forms a discharge station aligned with the tail end of the discharge slope; the tray track adopts a two-track design; a lifting cylinder for lifting from bottom to top is provided below the discharge station and located between two tracks of the tray track; a top of a piston of the lifting cylinder is provided with a lifting platform; the lifting platform is provided with a weighing sensor; a vertical stacking bin is provided above the discharge station; two sides of a bottom of the vertical stacking bin are provided with latch bolts, wherein the latch bolts are symmetrically arranged on the tray rack and move unidirectionally from bottom to top; and four corners of the tray are provided with spacing posts for ensuring a spacing between upper and lower trays.

7. The fruit post-harvest disinfection and conveying production line according to claim 6, wherein the latch bolt is an inverted L-shaped structure; a lower end of a vertical arm of the latch bolt is located on an elastic return rotating shaft; a horizontal arm of the latch bolt extends inward from an upper end of the vertical arm to support a bottom surface of the tray; and a limiting stopper is provided below the horizontal arm of the latch bolt.

8. The fruit post-harvest disinfection and conveying production line according to claim 6, wherein front and back sides of the lifting platform are respectively provided with swinging stoppers, wherein the swinging stoppers extend upward and are higher than a top surface of the lifting platform; an upper end of the swinging stopper is allowed to swing unidirectionally towards an inner side of the lifting platform; and a height of the tray track exceeds the top surface of the lifting platform, but is lower than a top end of the swinging stopper.

9. The fruit post-harvest disinfection and conveying production line according to claim 1, wherein there is a discharge gap greater than or equal to 10 cm between the first rotating shaft and the second rotating shaft at a backmost end; wherein a longitudinal spacing between a tail end of the first conveyor belt and a tail end of the second conveyor belt is greater than or equal to 10 cm; a fruit is discharged from a gap between the tail end of the first conveyor belt and the tail end of the second conveyor belt; and a surface of the workbench below the discharge gap is slanted to form the discharge slope, wherein the discharge slope comprises a higher front part and a lower back part.

10. The fruit post-harvest disinfection and conveying production line according to claim 1, wherein the workbench is provided with a channel below the conveyor belts; a bottom surface of the channel is provided with a plurality of longitudinally distributed air extracting ports; and the plurality of longitudinally distributed air extracting ports are connected to an air extracting pump.

11. The fruit post-harvest disinfection and conveying production line according to claim 1, wherein the workbench is provided with a channel-shaped cover plate above the conveyor belts; the first nozzle, the second nozzle, and the incoming material sensor are located on the channel-shaped cover plate; and a top surface of a back part of the channel-shaped cover plate is provided with a bar grille hollow.

12. The fruit post-harvest disinfection and conveying production line according to claim 1, wherein the tray track of the tray rack is configured to feed the tray from back to front; a frontmost end of the tray track forms a discharge station aligned with the tail end of the discharge slope; the tray track adopts a two-track design; a lifting cylinder for lifting from bottom to top is provided below the discharge station and located between two tracks of the tray track; a top of a piston of the lifting cylinder is provided with a lifting platform; the lifting platform is provided with a weighing sensor; a vertical stacking bin is provided above the discharge station; two sides of a bottom of the vertical stacking bin are provided with latch bolts, wherein the latch bolts are symmetrically arranged on the tray rack and move unidirectionally from bottom to top; and four corners of the tray are provided with spacing posts for ensuring a spacing between upper and lower trays.

13. The fruit post-harvest disinfection and conveying production line according to claim 12, wherein the latch bolt is an inverted L-shaped structure; a lower end of a vertical arm of the latch bolt is located on an elastic return rotating shaft; a horizontal arm of the latch bolt extends inward from an upper end of the vertical arm to support a bottom surface of the tray; and a limiting stopper is provided below the horizontal arm of the latch bolt.

14. The fruit post-harvest disinfection and conveying production line according to claim 12, wherein front and back sides of the lifting platform are respectively provided with swinging stoppers, wherein the swinging stoppers extend upward and are higher than a top surface of the lifting platform; an upper end of the swinging stopper is allowed to swing unidirectionally towards an inner side of the lifting platform; and a height of the tray track exceeds the top surface of the lifting platform, but is lower than a top end of the swinging stopper.

* * * * *